US009036784B2

(12) United States Patent
Oketa et al.

(10) Patent No.: US 9,036,784 B2
(45) Date of Patent: May 19, 2015

(54) POWER CONVERTER, X-RAY CT APPARATUS, AND X-RAY IMAGING APPARATUS

(75) Inventors: Takatsugu Oketa, Tokyo (JP); Hirokazu Iijima, Tokyo (JP); Takuya Domoto, Tokyo (JP)

(73) Assignee: HITACHI MEDICAL CORPORATION, Tokyo (JP)

( * ) Notice: Subject to any disclaimer, the term of this patent is extended or adjusted under 35 U.S.C. 154(b) by 411 days.

(21) Appl. No.: 13/575,459

(22) PCT Filed: Feb. 8, 2011

(86) PCT No.: PCT/JP2011/052611
§ 371 (c)(1),
(2), (4) Date: Jul. 26, 2012

(87) PCT Pub. No.: WO2011/099472
PCT Pub. Date: Aug. 18, 2011

(65) Prior Publication Data
US 2012/0294428 A1 Nov. 22, 2012

(30) Foreign Application Priority Data

Feb. 9, 2010 (JP) .................................. 2010-026556

(51) Int. Cl.
*H05G 1/10* (2006.01)
*H02H 7/122* (2006.01)
*H02M 7/48* (2006.01)
*H05G 1/20* (2006.01)
(Continued)

(52) U.S. Cl.
CPC ............... *H05G 1/10* (2013.01); *H02H 1/0038* (2013.01); *H02H 7/122* (2013.01); *H02M 1/32* (2013.01); *H02M 7/48* (2013.01); *H05G 1/20* (2013.01)

(58) Field of Classification Search
CPC .................................. H02H 7/122; H05G 1/10
USPC .......................................... 378/101, 107, 109
See application file for complete search history.

(56) References Cited

U.S. PATENT DOCUMENTS 4,734,924 A * 3/1988 Yahata et al. .................. 378/118
5,563,777 A * 10/1996 Miki et al. ....................... 363/37
(Continued)

FOREIGN PATENT DOCUMENTS

| JP | 2004-103345 | 4/2004 |
| JP | 2004-135489 | 4/2004 |
| JP | 2006-139941 | 6/2006 |

OTHER PUBLICATIONS

International Search Report in connection with PCT/JP2011/052611.

*Primary Examiner* — Michael Logie
(74) *Attorney, Agent, or Firm* — Cooper & Dunham LLP

(57) ABSTRACT

A power converter is configured to include an inverter which converts a DC output into an AC voltage of a predetermined frequency, and a high voltage generator which receives an output from output terminals of the inverter and boosts the output to a desired high DC voltage. The high voltage generator includes a transformer, and the primary windings of the transformer are connected to the output terminals of the inverter in parallel by conductive wires connected to both ends of each primary winding. Further, a current sensor is provided to detect a current flowing through each of the primary windings, and a control unit determines abnormalities of a path of the inverter and the primary windings on the basis of a value of the current sensor.

10 Claims, 17 Drawing Sheets

(51) Int. Cl.
*H02H 1/00* (2006.01)
*H02M 1/32* (2007.01)

(56) References Cited

U.S. PATENT DOCUMENTS

| | | | |
|---|---|---|---|
| 5,942,134 A * | 8/1999 | Cohrs et al. | 219/110 |
| 7,400,708 B2 | 7/2008 | Takahashi et al. | |
| 7,486,082 B2 | 2/2009 | Hachisuka et al. | |
| 7,492,162 B2 | 2/2009 | Hachisuka et al. | |
| 7,541,747 B2 | 6/2009 | Shinmen et al. | |
| 7,598,748 B2 | 10/2009 | Hachisuka et al. | |
| 2004/0012381 A1 * | 1/2004 | Hachisuka et al. | 324/117 R |
| 2004/0012987 A1 * | 1/2004 | Hachisuka et al. | 363/95 |
| 2004/0257834 A1 * | 12/2004 | Kazem | 363/16 |
| 2006/0043909 A1 * | 3/2006 | Hwang et al. | 315/276 |
| 2006/0165220 A1 * | 7/2006 | Takahashi et al. | 378/109 |
| 2007/0030606 A1 * | 2/2007 | Ganev et al. | 361/23 |
| 2008/0151450 A1 * | 6/2008 | Hsu et al. | 361/86 |
| 2009/0116618 A1 * | 5/2009 | Nakayama et al. | 378/107 |
| 2010/0149458 A1 * | 6/2010 | Nam et al. | 349/70 |
| 2010/0164385 A1 * | 7/2010 | Ashikaga et al. | 315/121 |
| 2010/0327763 A1 * | 12/2010 | Yao et al. | 315/250 |
| 2011/0002445 A1 * | 1/2011 | Hattrup et al. | 378/101 |
| 2012/0294428 A1 * | 11/2012 | Oketa et al. | 378/109 |

* cited by examiner

FIG. 5
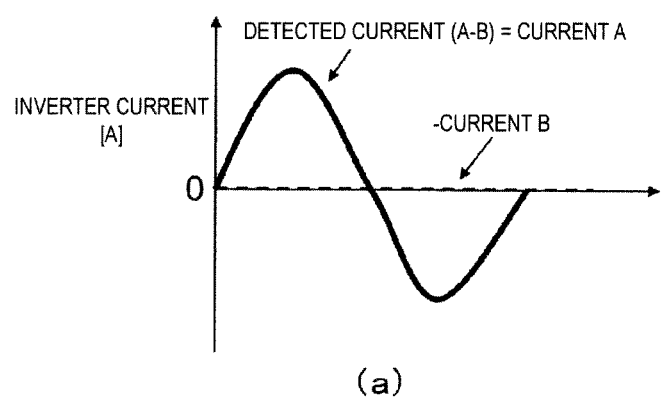
(a)
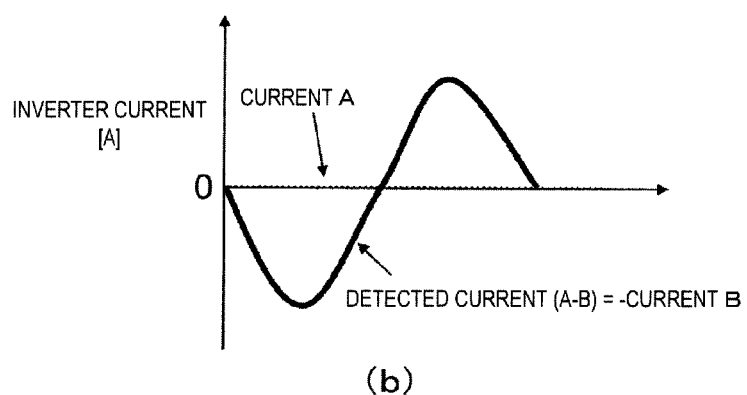
(b)

POWER CONVERTER, X-RAY CT APPARATUS, AND X-RAY IMAGING APPARATUS

TECHNICAL FIELD

The present invention relates to an industrial power converter and in particular, to a highly reliable power converter suitable for a medical X-ray high voltage device.

BACKGROUND ART

Generally, an inverter type X-ray high voltage device for medical or industrial applications converts an AC voltage, which is supplied from a commercial power supply through an AC reactor, into a DC voltage using a converter circuit or a chopper circuit formed by a thyristor or a diode and inputs this DC voltage to an inverter circuit after smoothing the DC voltage with a capacitor. This inverter circuit controls the phase difference, the frequency, the pulse width, and the like of the inverter circuit using the resonance phenomenon of a resonance capacitor and the leakage inductance of a high voltage transformer. Then, a high voltage generator boosts the DC voltage to a high DC voltage, and this high DC voltage is applied to an X-ray tube which is a load.

CITATION LIST

Patent Literature

[PTL 1] JP-A-2004-14165

SUMMARY OF INVENTION

Technical Problem

In recent years, due to the high output of the apparatus, the output required for the inverter has been increasing every year. Although it has been common to provide one primary winding of a main transformer to which the output of the inverter is directly applied and which is mounted in the high voltage generator, it may be considered to increase the number of primary windings of the main transformer in order to realize the supply of a large current.

However, when the number of primary windings of the main transformer is increased to form two parallel primary windings, for example, two inverter output cables for each round trip, that is, a total of four cables are required. Such an increase in the number of cables may cause incorrect wiring. In addition, since the cables are thinner, a problem also occurs in that the cables easily become disconnected compared with the related art.

As solutions to these problems, attaching a connection name plate may be considered for prevention of incorrect wiring, and sufficient fixing or reinforcement using a protective tube may be considered for prevention of disconnection.

However, only with the above solutions, the possibility of mistakenly performing incorrect wiring of the connection name plate is not zero and the possibility of not noticing the disconnection remains, since the worker is a human being. For this reason, it is necessary to provide a mechanism which stops the apparatus safely even if the apparatus is operated in a state where incorrect wiring or disconnection has occurred, so that the circuits are not damaged.

It is an object of the present invention to provide a power converter which enables the supply of a large current.

Solution to Problem

In order to solve the problems described above, according to the present invention, the following power converter is provided. That is, there is provided a power converter including an inverter which converts a DC output into an AC voltage of a predetermined frequency and a high voltage generator which receives an output from output terminals of the inverter and boosts the output to a desired high DC voltage. The high voltage generator includes a transformer having a primary winding and a secondary winding. The number of primary windings is two or more, and the plurality of primary windings are connected to the output terminals of the inverter in parallel by conductive wires connected to both ends of each primary winding.

The power converter described above includes a current sensor, which detects a current flowing through each of the plurality of primary windings, and a control unit that determines that abnormalities have occurred, from the output of the current sensor, when a current of any of the plurality of primary windings does not flow or is smaller than current values of the other primary windings.

For example, the current sensor is configured to detect a current flowing into any of the plurality of primary windings and a current flowing from the different primary winding. The control unit may calculates the difference in the amount of the two currents detected by the current sensor and determine that abnormalities have occurred when the calculation result exceeds a threshold value set in advance.

In addition, for example, the current sensor is configured to detect a current by calculating the difference between the amount of a current flowing into any of the plurality of primary windings and the amount of a current flowing from the different primary winding.

The control unit may determine that abnormalities have occurred when the current detected by the current sensor exceeds a threshold value set in advance. In this case, as the current sensor, it is possible to use an AC current sensor which has a coil in which both a conductive wire for supplying a current to any of the primary windings and a conductive wire for returning a current from the different primary winding are disposed in an inner space, and which detects a current flowing through the coil.

When the abnormalities are determined, based on whether or not a current flows through any one of the plurality of primary windings, the control unit may specify a primary winding through which the current does not flow.

In addition, in the present invention, an X-ray CT apparatus using the power converter described above is provided. That is, there is provided an X-ray CT apparatus including: a disk having an opening through which an object is inserted; an X-ray tube and an X-ray detector mounted at opposite positions with the opening of the disk interposed therebetween; an X-ray high voltage device which supplies DC power to the X-ray tube; a bed on which an object is placed and is inserted into the opening of the disk; and a rotation driving unit that rotates the disk. The X-ray high voltage device includes the power converter described above.

In addition, in the present invention, an X-ray imaging apparatus using the power converter described above is provided. That is, there is provided an X-ray imaging apparatus including: an X-ray tube; an X-ray image receiver which detects X-rays transmitted through an object; and an X-ray high voltage device which supplies DC power to the X-ray tube. The X-ray high voltage device includes the power converter described above.

Advantageous Effects of Invention

According to the present invention, since a current can be supplied to each of the plurality of parallel primary windings, the supply of a large current is possible. In addition, since incorrect wiring or disconnection of the cable for inverter output to the primary winding can always be detected, damage to the apparatus can be avoided.

BRIEF DESCRIPTION OF DRAWINGS

FIG. 5(a) is an explanatory view showing a state where abnormalities occur in one of two parallel primary windings and a current A does not flow in the configuration of FIG. 2, and FIG. 5(b) is an explanatory view showing a state where abnormalities occur in one of two parallel primary windings and a current B does not flow in the configuration of FIG. 2.

DESCRIPTION OF EMBODIMENTS

Hereinafter, embodiments of the present invention will be described on the basis of the drawings.

First Embodiment

First, as a first embodiment of the present invention, a power converter which includes two parallel primary windings of a main transformer and which enables the supply of a large current will be described. The power converter of the present embodiment is a device which converts a commercial voltage into a high voltage and supplies the high voltage to an X-ray tube.

Figure 1:
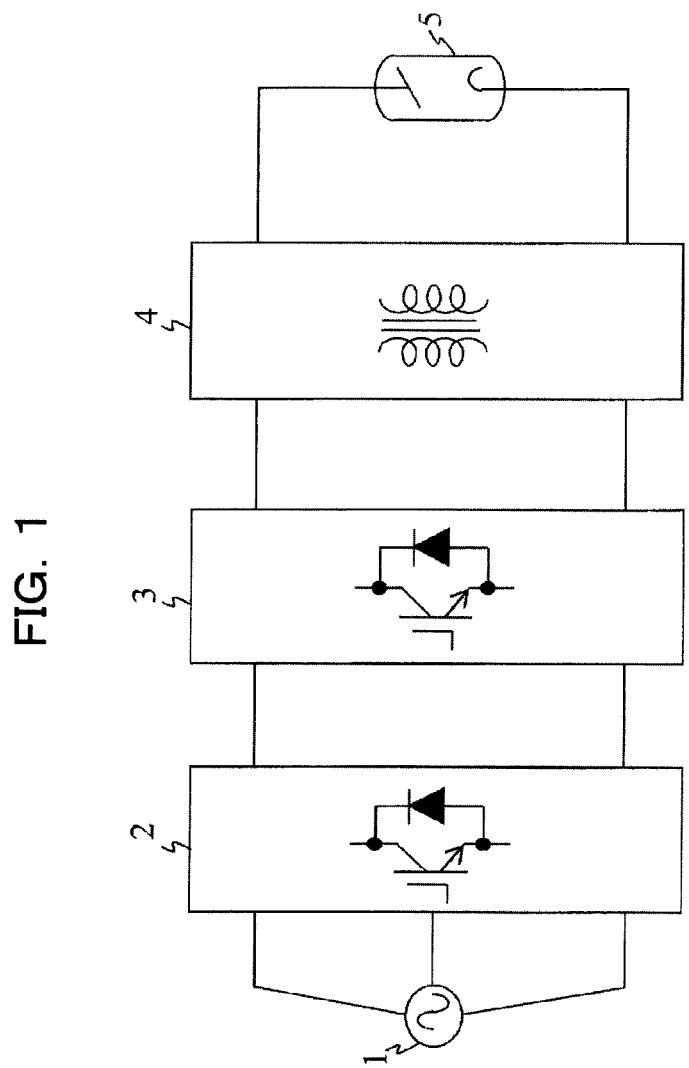
FIG. 1 is a block diagram showing the configuration of a power converter of a first embodiment.

The structure of the power converter is shown in FIG. 1. As shown in FIG. 1, the power converter includes: a circuit 2 (for example, a converter or a chopper) which steps up or steps down the voltage of a commercial power supply 1 to rectify it; an inverter 3 which converts a DC output of the circuit into an AC voltage of a predetermined frequency; and a high voltage generator 4 which boosts a high-frequency AC voltage output of the inverter 3 to a desired high DC voltage. An X-ray tube 5 is connected to the high voltage generator 4. X-rays are emitted by applying the high voltage from the high voltage generator 4 to the X-ray tube 5.

Next, the respective functions of the above-described components will be described. The circuit 2 which steps up or steps down the voltage of the commercial power supply 1 to rectify it will be described as a boost converter herein. The boost converter is a high power factor converter with a boosting function using an IGBT (insulated gate bipolar transistor) which is a power module. This boost converter is means which applies a DC voltage to an inverter after smoothing the harmonic power with a smoothing element, such as a capacitor, while reducing the harmonic power by rectifying a commercial three-phase AC power supply voltage of 50 Hz or 60 Hz by PWM operation while matching the phase voltage waveform and the phase current waveform so that the power factor is set to almost 1. This boost converter operates as a full-wave rectifier circuit if the operation of the IGBT, which is a power device, is stopped, and the DC output voltage at that time is a value of $\sqrt{2}$ times the AC input voltage.

The inverter 3 receives the DC voltage output from the boost converter 2 and converts it into a high-frequency AC voltage, and also controls a voltage (tube voltage) applied to the X-ray tube 5.

The high voltage generator 4 receives the AC voltage from the inverter 3 and converts it into a high DC voltage, and the primary winding of the main transformer mounted therein is connected to the output side of the inverter 3. In the present embodiment, in order to enable the supply of a large current, the number of primary windings of the main transformer is 2, and they are connected in parallel to the inverter.

The X-ray tube 5 receives the output voltage from the high voltage generator 4 to generate X-rays.

Figure 2:
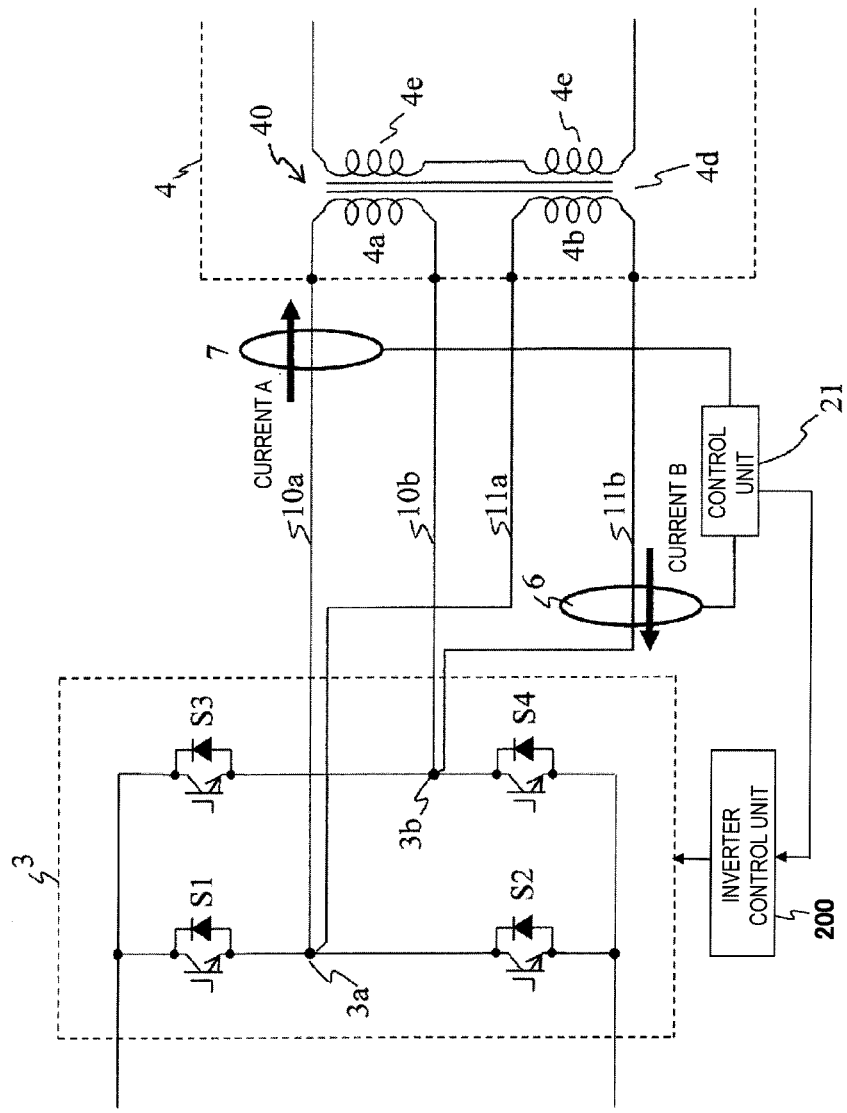
FIG. 2 is a block diagram showing the circuit configuration of a part of an inverter 3 and a transformer of a high voltage generator 4 of the power converter shown in FIG. 1.

FIG. 2 is a view showing specifically a part of the circuit configuration of the inverter 3 and the high voltage generator 4. The inverter 3 includes an inverter circuit obtained by bridge connection of four switches S1 to S4, each of which has a configuration in which a diode is antiparallel-connected to a transistor (for example, an IGBT), as shown in FIG. 2 and an inverter driving circuit (not shown) which inputs an ON/OFF control signal to the transistor of each of the switches S1 to S4. The structure of the inverter 3 is a structure widely known due to PTL 1 and the like.

The high voltage generator 4 includes a transformer 40 which includes two primary windings 4a and 4b, an iron core 4d, and a secondary winding 4e. The primary windings 4a and 4b are connected to the inverter circuit in parallel.

Output lines of the inverter 3 are connected to output terminals 3a and 3b in parallel to each other. Except for this, the inverter 3 is the same as a known inverter. First, the switches S1 to S4 are turned on. Accordingly, a current flows to the primary windings 4a and 4b of the main transformer 40 of the high voltage generator 4 through the switch S1 and outgoing cables 10a and 11a. Then, the current flows to the commercial power supply 1 through return cables 10b and 11b and the switch S4.

Then, the switches S2 and S3 are turned on. Accordingly, the current flows to the primary windings 4a and 4b of the main transformer of the high voltage generator through the switch S2 and the outgoing cables 10a and 11a. Then, the current flows to the commercial power supply 1 through the return cables 10b and 11b, a DC current sensor 6, and the switch S3. This operation is repeated at high frequency in order to acquire a required output.

As shown in FIG. 2, by adopting a two-parallel configuration of the primary windings 4a and 4b of the main transformer 40 of the high voltage generator 4, a current equivalent to twice the maximum current which can flow through one cable and one primary winding can be supplied to the transformer 40, a large current can be output.

However, two outgoing cables and two return cables are provided due to the two-parallel structure. Accordingly, for example, when a current does not flow through the primary winding 4b of the main transformer due to incorrect wiring or disconnection of the inverter output cable 11a, the same amount of current flows through the primary winding 4a of the main transformer. In this case, since a current which exceeds the allowable current of the primary winding of the main transformer flows, the main transformer may be damaged.

In the present embodiment, in order to prevent this, current sensors 7 and 6 are disposed on the outgoing cable 10a and the return cable 11b, respectively, in order to detect the amount of current flowing therethrough. In this case, the current sensor 7 is fixed so as to detect a current A flowing from the outgoing cable 10a toward the return cable 10b as positive amplitude. On the other hand, the fixing direction of the current sensor 6 is set such that a current B flowing from the outgoing cable 11a toward the return cable 11b is detected as negative amplitude, that is, with an opposite phase to the current sensor 7. A control unit 21 is connected to the current sensors 6 and 7.

Figure 3:
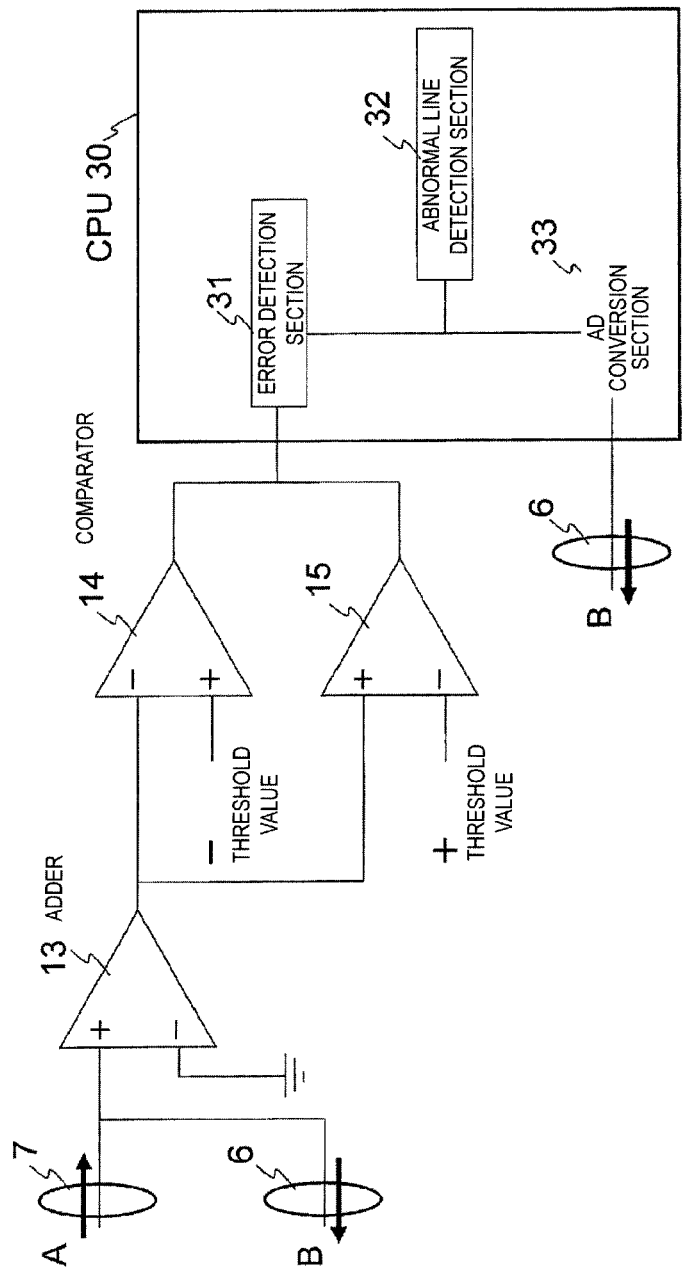
FIG. 3 is a block diagram showing the circuit configuration of a control unit 21 shown in FIG. 2.

As shown in FIG. 3, the control unit 21 includes an adder 13 for adding the outputs of the current sensors 6 and 7, comparators 14 and 15 which compare the output of the adder 13 with positive and negative threshold values set in advance, and a CPU 30. The CPU 30 includes an error detection section 31, an abnormal line detection section 32, and an AD conversion section 33. In addition, the error detection section 31 and the abnormal line detection section 32 are realized by performing error detection and abnormal line detection operations when the CPU 30 executes a program stored in advance in a memory of the CPU 30.

The operation of the control unit 21 will be described using FIGS. 4 to 7. The current sensor 7 detects the current A flowing through the primary winding 4a of the main transformer in the high voltage generator 4. The current sensor 6 detects the current B, which flows from the primary winding 4b, with an opposite phase. Therefore, the adder 13 of the control unit 21 calculates "current A−current B" by adding the detection results of the current sensors 6 and 7.

Figure 4:
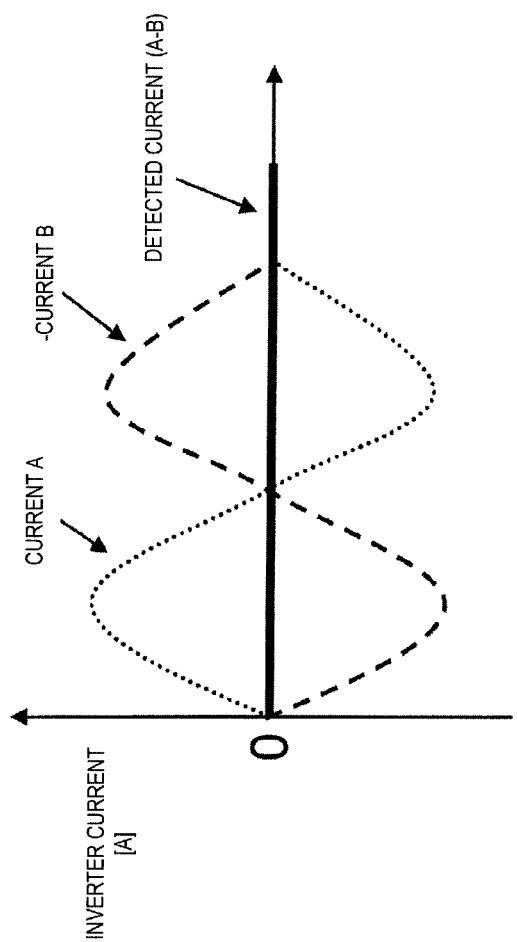
FIG. 4 is an explanatory view showing that currents A and B flowing through two parallel primary windings are in the normal state, in the configuration of FIG. 2.
Figure 6:
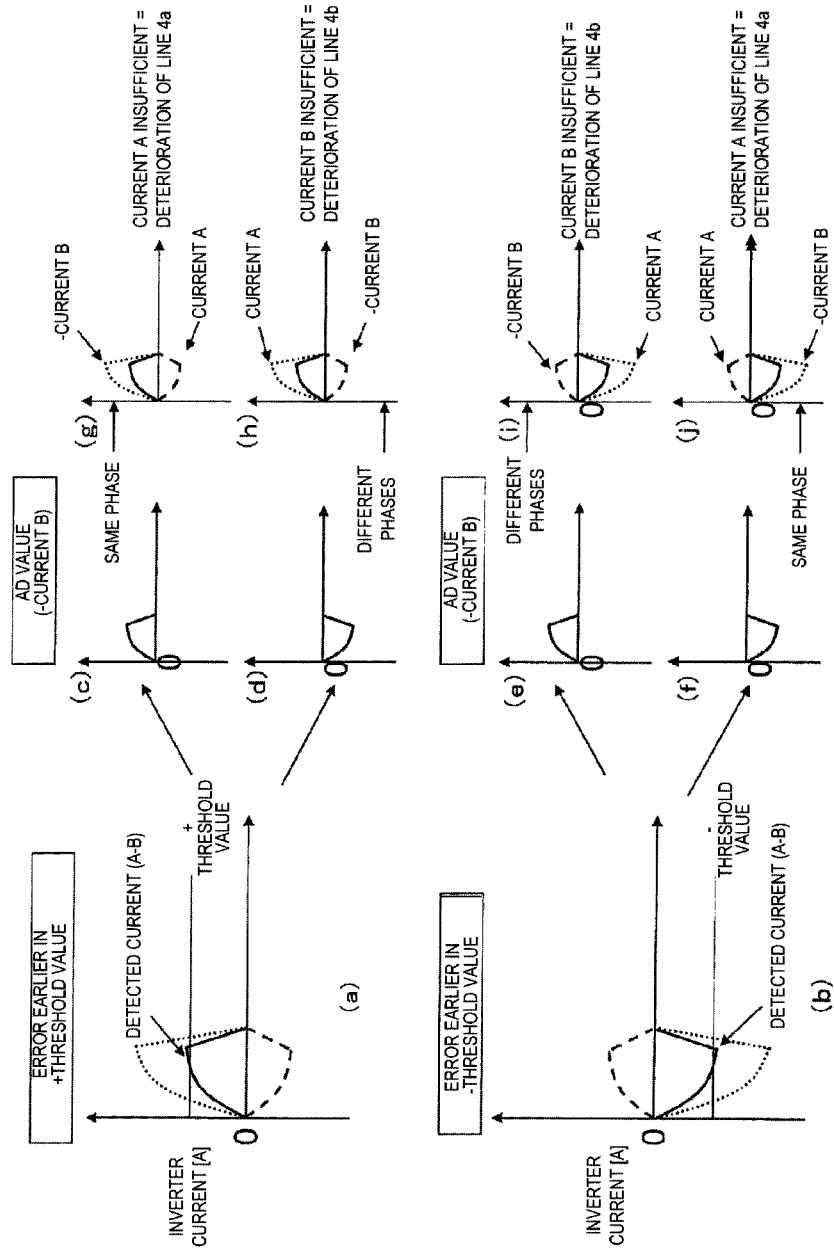
FIGS. 6(a) and 6(b) are explanatory views showing a state where abnormalities occur in circuit elements of an inverter and the like and a current of one of two parallel primary windings is lower than a current of the other one.
FIGS. 6(c) to 6(f) are explanatory views showing the phase of the current B.
FIGS. 6(g) to 6(j) are explanatory views for determining which of the currents A and B has deteriorated on the basis of FIGS. 6(a) to 6(f).

Since the primary windings 4a and 4b are connected in parallel to each other by the outgoing cables 10a and 11a and the return cables 10b and 11b, currents flowing therethrough are the same in phase and amount. Accordingly, the "current A−current B" output from the adder 13 is always zero as shown in FIG. 4. When this state is defined as a normal state, for example, in the case of incorrect wiring or disconnection of the cable 10a or 10b in FIG. 2, the current A does not flow and only the current B flows. As a result, the "current A−current B" has the same waveform as "−current B" output from the current sensor 6 as shown in FIG. 5(b). In addition, "−current B" indicates a detection current when the current sensor 6 detects the current B with the opposite phase. Moreover, on the contrary, in the case of incorrect wiring or disconnection of the cable 11a or 11b, the current B does not flow and only the current A flows. As a result, the "current A−current B" has the same waveform as the current A as shown in FIG. 5(a). Accordingly, the output of the adder 13 is compared with each of the negative and positive threshold values set in advance by the comparators 14 and 15. When the addition value is smaller than the negative threshold value or larger than the positive threshold value, the error detection section 31 of the CPU 30 determines that an error has occurred and as a result, incorrect wiring or disconnection can be detected. In addition, in the following explanation, the case where the addition value is smaller than the negative threshold value and the case where the addition value is larger than the positive threshold value are also collectively called a case where the threshold value is exceeded.

On the other hand, when one of the currents A and B does not meet a predetermined current value due to deterioration or initial failure of electrical components, such as a transistor of the inverter 3, or the primary winding 4a or 4b of the main transformer in the high voltage generator 4 and accordingly a current equivalent to the difference is added to the other current, the amplitude of the current waveform detected by the current sensors 7 and 6 is reduced as shown in FIG. 6(a) or 6(b). Also in this case, by setting the threshold values of the comparators 14 and 15 to be smaller than the amplitude in FIGS. 6(a) and 6(b), the error detection section 31 can detect an error from the outputs of the comparators 14 and 15.

Figure 7:
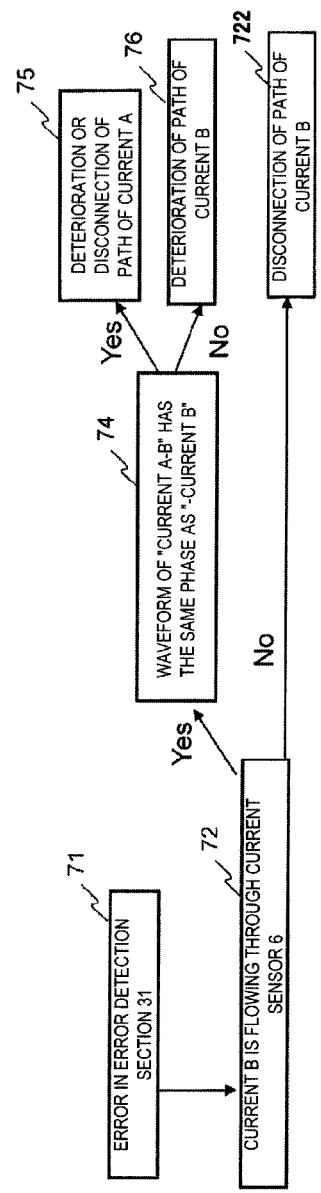
FIG. 7 is an explanatory view showing a determination operation of an abnormal line detection section 32 of a CPU 30 in the configuration of FIG. 3.

If the error detection section 31 determines that an error has occurred, the abnormal line detection section 32 distinguishes an abnormal line according to the flow shown in FIG. 7. That is, when the error detection section 31 determines that an error has occurred (step 71), the abnormal line detection section 32 receives a digital signal, which is obtained by converting the current B detected by the current sensor 6, from the AD conversion section 33. The abnormal line detection section 32 determines whether the current B detected by the DC current sensor 6 flows or does not flow (is zero) (step 72).

When the current B does not flow, the abnormal line detection section 32 determines that incorrect wiring or disconnection of the path of the current B, that is, the cable 11a or 11b has occurred, or determines that the primary winding 4b is broken (step 722).

On the other hand, when the current B flows in step 72, the process proceeds to step 74 to determine whether the waveform of the "current A−current B" output from the adder 13 has the same phase as the "−current B" detected by the current sensor 6 or has a different phase. The phase of the waveform of the "current A−current B" is determined according to which of the comparators 14 and 15 has output a threshold value excess signal first.

Specifically, when the waveform output of the "current A−current B" from the adder 13 has a phase changing from positive to negative as shown in FIG. 6(a), the comparator 15 which performs comparison with the "+" threshold value outputs the threshold value excess signal earlier than the comparator 14 which performs comparison with the "−" threshold value. On the other hand, when the waveform output of the "current A−current B" has a phase changing from negative to positive as shown in FIG. 6(b), the comparator 14 which performs comparison with the "−" threshold value outputs the threshold value excess signal earlier than the comparator 15 which performs comparison with the "+" threshold value. Therefore, the abnormal line detection section 32 can determine whether the phase of the waveform of the "current A−current B" output from the adder 13 is the phase shown in FIG. 6(a) or the phase shown in FIG. 6(b) depending on which of the comparators 14 and 15 outputs the threshold value excess signal first to the error detection section 31.

The abnormal line detection section 32 compares the phase of the waveform of the "current A−current B" output from the adder 13 with the phase of the "−current B" acquired from the AD conversion section 33 (step 74). When the phase of the waveform of the "current A−current B" is as shown in FIG. 6(a) and the phase of the "−current B" is as shown in FIG. 6(c) which is the same phase as the waveform shown in FIG. 6(a), it can be determined that the amount (amplitude) of the current B is larger than that of the current A as shown in FIG. 6(g). Therefore, it can be determined that there has been deterioration or disconnection of the path of the current A. That is, incorrect wiring, disconnection, or deterioration of the cable 10a or 10b through which the current A flows or disconnection or deterioration of the primary winding 4a and deterioration of electrical components, such as a transistor of the inverter 3 which supplies the current A, are determined (step 75). Hereinafter, deterioration of a primary winding or a cable and deterioration of electrical components such as a transistor are called "deterioration of the path of a current".

In addition, in step 74, when the phase of the waveform of the "current A−current B" is as shown in FIG. 6(a) and the phase of the "−current B" is as shown in FIG. 6(d) which is the different phase from the phase of the waveform shown in FIG. 6(a), it can be determined that the amount (amplitude) of the current A is larger than that of the current B as shown in FIG. 6(h). Therefore, deterioration of the path of the current B can be determined. In this case, since it is determined that the current B flows in step 72, the path of current B is not disconnected. Accordingly, deterioration of the cable 11a or 11b through which the current B flows or deterioration of the primary winding 4b and deterioration of electrical components, such as a transistor of the inverter 3 which supplies the current B, are determined (step 76).

Similarly, in step 74, when the phase of the waveform of the "current A−current B" is as shown in FIG. 6(b) and the phase of the "−current B" is as shown in FIG. 6(e) which is the different phase from the phase of the waveform shown in FIG. 6(b), it can be determined that the amount (amplitude) of the current A is larger than that of the current B as shown in FIG. 6(i). Therefore, deterioration of the path of the current B is determined.

In addition, in step 74, when the phase of the waveform of the "current A−current B" is as shown in FIG. 6(b) and the phase of the "−current B" is as shown in FIG. 6(f) which is the same phase as the waveform shown in FIG. 6(b), it can be determined that the amount (amplitude) of the current B is larger than that of the current A as shown in FIG. 6(j). Therefore, disconnection or deterioration of the path of the current A is determined.

As described above, when the abnormal line detection section of the control unit 21 determines that abnormalities have occurred called incorrect wiring, disconnection, or deterioration of a current path, the control unit 21 can output a signal to an inverter control unit 200 or the like of the inverter 3 to stop the operation of at least the inverter 3, so that the apparatus can be stopped safely.

Thus, in the present embodiment, not only can a large current be supplied by disposing two primary windings of a transformer in parallel, but also the occurrence of incorrect wiring, disconnection, or deterioration of a cable and a cable (system) in which abnormalities have occurred can be specified and determined. In addition, apparatus deterioration caused by prolonged use or inverter current abnormalities caused by initial failure can always be detected. Therefore, it is possible to provide a power converter satisfying both the supply of a large current and the safety.

In addition, in the present embodiment, the configuration of performing error determination on the basis of the value obtained by adding the outputs of the current sensors 6 and 7 using the adder 13 is adopted. Accordingly, since the current sensors 6 and 7 need to detect the current value accurately, it is desirable to use current sensors with the same structure.

In addition, when each of the two current sensors 6 and 7 includes a DC component detection circuit, it is possible to detect that the currents flowing through the two current sensors 6 and 7 are asymmetrical. When the outputs of the inverter 3 are asymmetrical currents (voltages), magnetic polarization of the iron core 4d of the main transformer 40 in light load conditions may occur, causing magnetic saturation. Accordingly, when the DC component detection circuits of the current sensors 6 and 7 detect asymmetrical currents, the asymmetrical currents can be eliminated by correcting a switching signal supplied from the inverter driving circuit to the inverter 3. As a result, magnetic saturation can be prevented. In addition, since a configuration which prevents this magnetic saturation is disclosed in PTL 1, detailed explanation thereof will be omitted herein.

In addition, although the current sensors 6 and 7 are disposed on respective cables of two parallel primary windings in the present embodiment, the reason is as follows. For example, when no current flows through the primary winding 4a of the main transformer due to incorrect wiring or disconnection of the inverter output cable 11a, the same amount of current flows through the primary winding 4b of the main transformer. In this case, since a current which is larger than the allowable current of the primary winding of the main transformer flows, it can be detected by any one of the current sensors, for example, by only the current sensor 6. That is, one current sensor 6 can detect that the detected current of the current sensor 6 exceeds a threshold value which is larger than a predetermined value. However, at the time of low output, that is, in the output conditions in which a large current is not required, even if a double current flows through one current sensor, it may not reach the threshold value. In this case, abnormalities cannot be detected. In the present embodiment, in order to solve this problem, the two current sensors 6 and 7 are disposed and determination is performed using the added current value. Therefore, even at the time of low output, abnormalities can be detected.

As described above, in the present embodiment, incorrect wiring or disconnection of inverter output cables and inverter current abnormalities caused by deterioration and initial failure of electrical components and the like can always be detected to stop the apparatus and perform display or the like of the abnormal place. As a result, since damage to the apparatus can be avoided, the apparatus can be restored.

Second Embodiment

Figure 8:
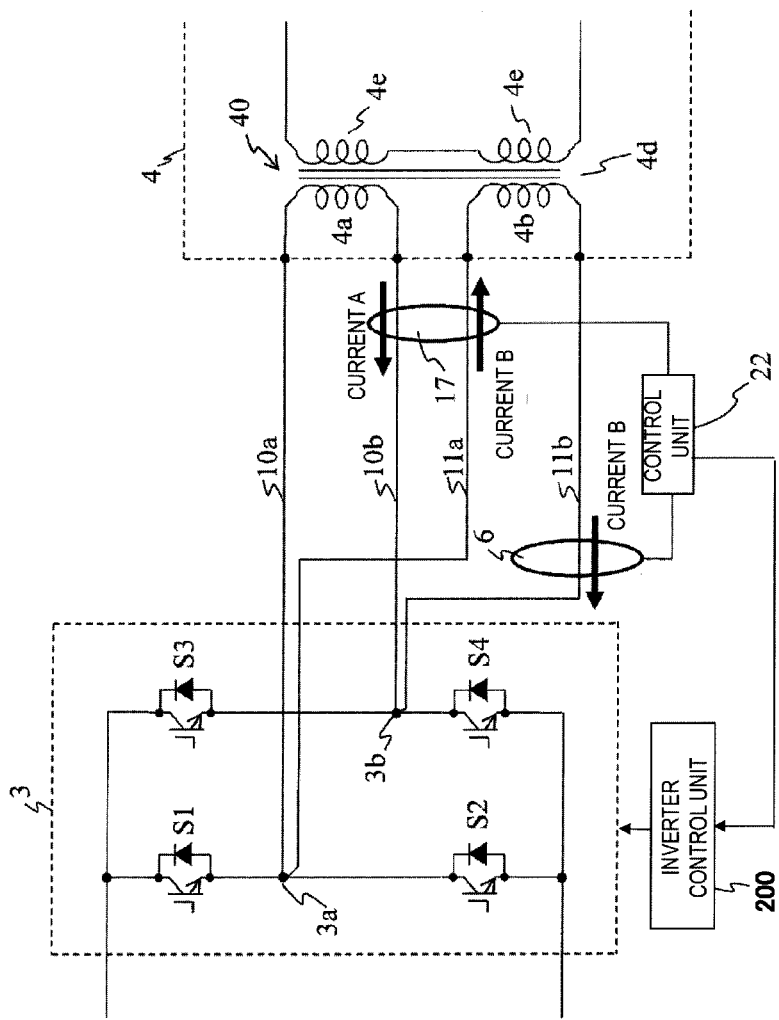
FIG. 8 is a block diagram showing the circuit configuration of a part of an inverter 3 and a transformer of a high voltage generator 4 of a power converter of a second embodiment.
Figure 9:
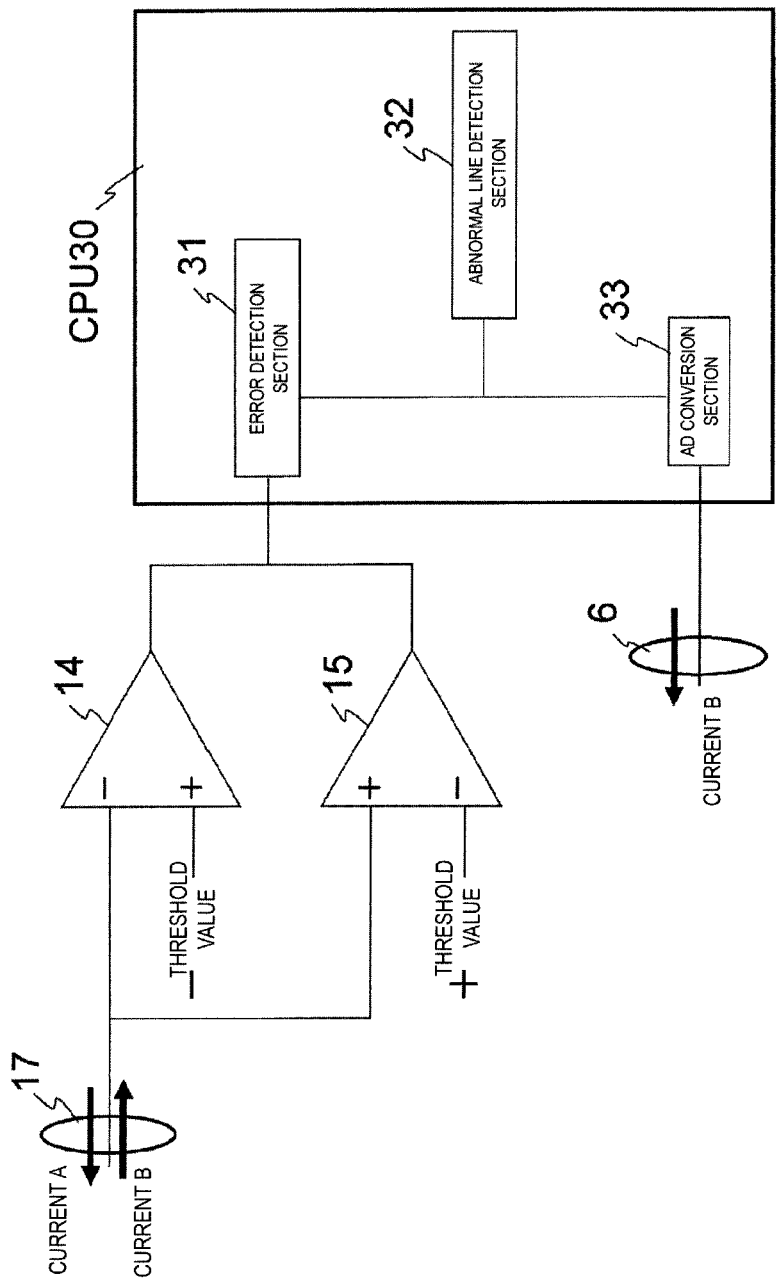
FIG. 9 is a block diagram showing the circuit configuration of a control unit 22 shown in FIG. 8.

In a second embodiment, one of the two current sensors in the first embodiment is set as an AC current sensor 17, and this AC current sensor 17 is disposed as shown in FIG. 8 so that error determination and abnormal line detection are performed by a control unit 22 with a simple circuit configuration.

In order to detect "current A−current B" by subtracting the current B flowing through the primary winding 4b of the main transformer in the high voltage generator 4 from the current A output from the primary winding 4a, the AC current sensor 17 is disposed such that two cables 10b and 11a are located inside the coil of the AC current sensor 17. By detecting a current flowing through the coil, the "current A−current B" is detected. The current sensor 6 is disposed so as to detect the current B of the cable 11b with an opposite phase as in the first embodiment.

The AC current sensor 17 and the current sensor 6 are connected to the control unit 22. Since the AC current sensor 17 detects the "current A−current B" by subtracting the current B from the current A, the control unit 22 does not include the adder 13 of the control unit 21 in the first embodiment. In addition, an output current of the current sensor 6 is input to the AD conversion section 33. Since a method of detecting the abnormalities, such as incorrect wiring, disconnection, and deterioration, and a method of determining the abnormal place by the control unit 22 are the same as those in the first embodiment, explanation thereof will be omitted.

In the second embodiment, the "current A−current B" obtained by subtracting the current B from the current A can be detected by using the AC current sensor 17. For this reason, it is not necessary to use the high-precision current sensors 6 and 7 in order to match the output values of the two current sensors 6 and 7 each other precisely, unlike the case where the current values detected by the current sensors 6 and 7 are added by the adder in the first embodiment. Accordingly, a small and inexpensive sensor can be used as the AC current sensor 17.

In addition, although the AC current sensor 17 is fixed to the cables 10b and 11a in the embodiment described above, it is needless to say that the AC current sensor 17 can be fixed to the cable 10a and 11b.

Third Embodiment

Although the power converter of the first embodiment described above has a structure in which the two primary windings 4a and 4b of the main transformer 40 are connected to the inverter 3 in parallel, a configuration in which three primary windings 4a, 4b, and 4c are connected to output terminals 3a and 3b of the inverter 3 in parallel is adopted in the third embodiment.

Figure 10:
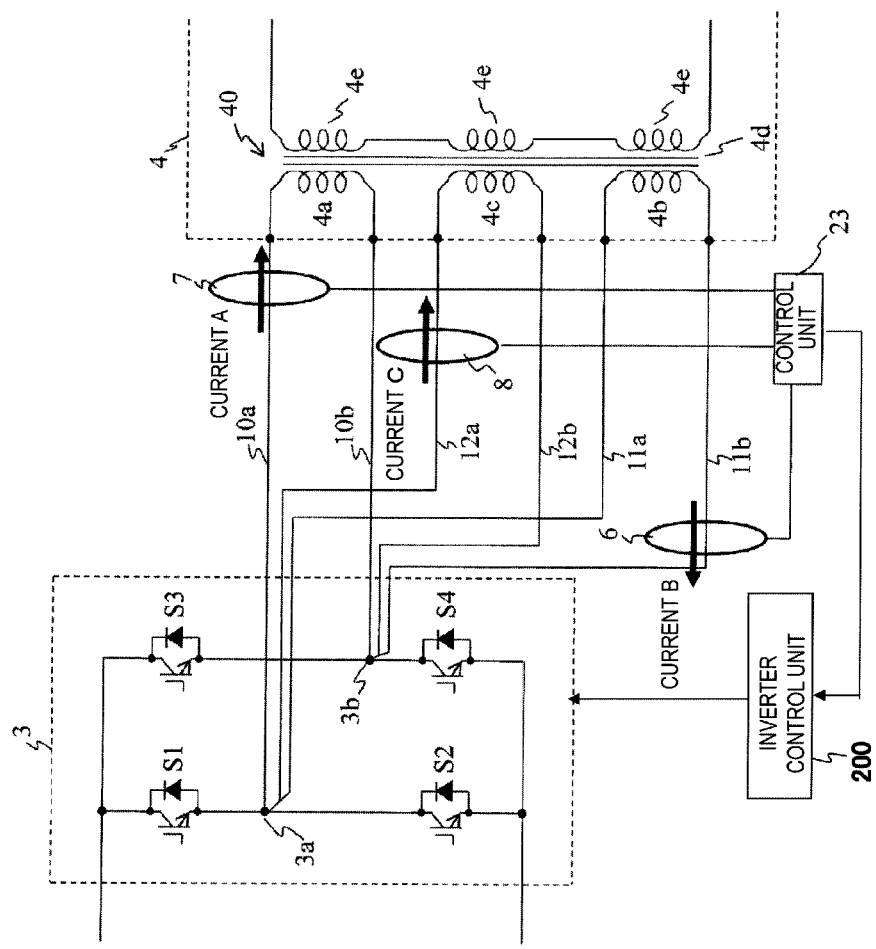
FIG. 10 is a block diagram showing the circuit configuration of a part of an inverter 3 and a transformer of a high voltage generator 4 of a power converter of a third embodiment.

As shown in FIG. 10 which shows a structure of an inverter circuit of the inverter 3 and the main transformer 40 of the high voltage generator 4, the third primary winding 4c is connected to the inverter 3 through an outgoing cable 12a and a return cable 12b. As in the first embodiment, the current sensors 7 and 6 are fixed to the outgoing cable 10a of the primary winding 4a and the return cable 11b of the primary winding 4b, respectively. A current sensor 8 is fixed to the outgoing cable 12a of the primary winding 4c. In this case, the current sensor 7 is fixed so as to detect a current A flowing from the outgoing cable 10a toward the return cable 10b as positive amplitude, as in the first embodiment. Similarly, the current sensor 8 is fixed so as to detect a current C flowing from the outgoing cable 12a toward the return cable 12b as a positive amplitude. The fixing direction of the current sensor 6 is set such that a current B flowing from the outgoing cable 11a toward the return cable 11b is detected as a negative amplitude, that is, with an opposite phase to the current sensors 7 and 8. A control unit 23 performs error detection, such as cable disconnection, specification of a disconnected cable, and the like.

Figure 11:
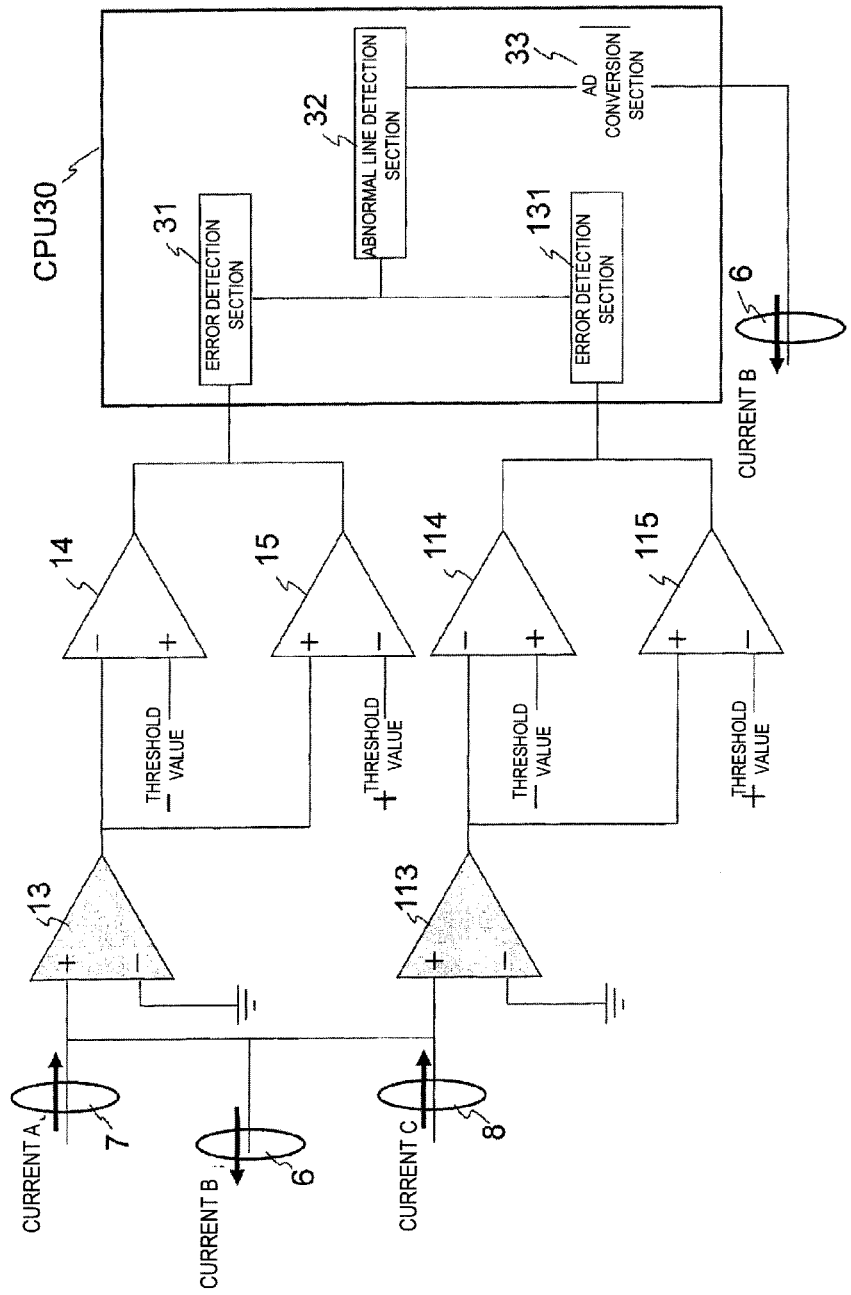
FIG. 11 is a block diagram showing the circuit configuration of a control unit 23 shown in FIG. 10.

FIG. 11 shows a structure of the control unit 23. In addition to the same adder 13 and comparators 14 and 15 as the control unit 21 in the first embodiment, the control unit 23 further includes an adder 113 and comparators 114 and 115. Moreover, a CPU 30 of the control unit 23 further includes an error detection section 131 in addition to the error detection section 31, the abnormal line detection section 32, and the AD conversion section 33. The other configuration is the same as that in the first embodiment.

The operation of the control unit 23 will be described. Operations of the adder 13 and the comparators 14 and 15 are the same as those in the control unit 21 of the first embodiment. The outputs of the current sensors 6 and 7 are added and the addition result is compared with positive and negative threshold values set in advance. When the addition result is smaller than the negative threshold value or larger than the positive threshold value, the error detection section 31 determines that disconnection or the like has occurred in the cable of the primary winding 4a or the primary winding 4b and accordingly no current flows.

On the other hand, the current sensor 8 measures the current C of the outgoing cable 12a to the primary winding 4c. The adder 113 and the comparators 14 and 15 calculate "current C−current B" by adding the outputs of the current sensors 6 and 8 and compare the addition result with positive and negative threshold values set in advance. When the addition result is smaller than the negative threshold value or larger than the positive threshold value, the error detection section 131 determines that disconnection or the like has occurred in the cable of the primary winding 4b or the primary winding 4c and accordingly no current flows.

In addition, the negative threshold values set in the comparators 14 and 114 are the same values, and the positive threshold values set in the comparators 15 and 115 are the same values.

Figure 12:
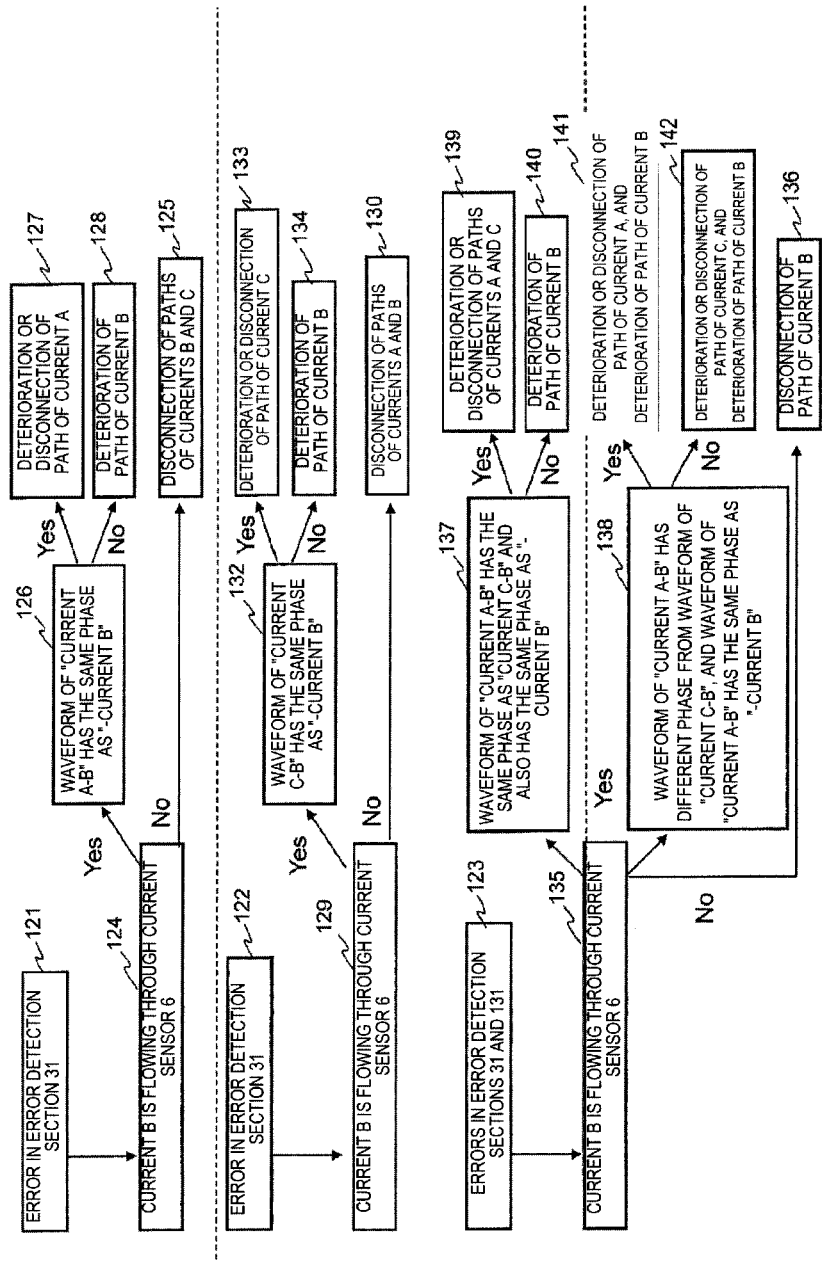
FIG. 12 is an explanatory view showing a determination operation of an abnormal line detection section 32 of a CPU 30 shown in FIG. 11.

The abnormal line detection section 32 performs determination according to the flow shown in FIG. 12, and determines in which cable the abnormalities have occurred. First, by acquiring the outputs of the error detection sections 31 and 131, the abnormal line detection section determines whether only the error detection section 31 or only the error detection section 131 or both the error detection sections 31 and 131 have determined that an error has occurred due to the outputs of the adders 13 and 113 exceeding the threshold value (steps 121, 122, and 123).

A case where only the error detection section 31 has detected an error (step 121) will be described. The abnormal line detection section 32 acquires a digital signal, which is obtained by converting the "−current B" output from the current sensor 6, from the AD conversion section 33 and determines whether or not a current flows through the current sensor 6 (step 124). When no current flows through the current sensor 6, the error of the error detection section 31 is a detection of wrong connection or disconnection of the cables 11a and 11b of the primary winding 4b. Accordingly, it can be determined that there are no abnormalities in the cables 10a and 10b of the primary winding 4a. In addition, since the error detection section 131 has detected no errors even though no current flows through the cables 11a and 11b of the primary winding 4b, it can be determined that a current does not flow through the cables 12a and 12b of the primary winding 4c either. From the above, the abnormal line detection section 32 determines that a wrong connection or a disconnection has occurred in both the path (the primary winding 4b or the cables 11a and 11b) of the current B and the path (the primary winding 4c or the cables 12a and 12b) of the current C (step 125).

On the other hand, when the current B flows in step 124, the process proceeds to step 126 to determine whether the waveform of the "current A–current B" output from the adder 13 has the same phase as the "–current B" detected by the current sensor 6 or has a different phase, in the same manner as in step 74 of FIG. 7 in the first embodiment. Then, as in steps 75 and 76 in the first embodiment, when the waveform of the "current A–current B" output from the adder 13 has the same phase as the "–current B" detected by the current sensor 6, deterioration or disconnection of the path of the current A is determined. That is, incorrect wiring, disconnection, or deterioration of the cable 10a or 10b through which the current A flows or disconnection or deterioration of the primary winding 4a and deterioration of electrical components, such as a transistor of the inverter 3 which supplies the current A, are determined (step 127).

On the other hand, when the waveform of the "current A–current B" after addition of the currents A and B has a different phase from the "–current B" detected by the current sensor 6 in step 126, deterioration of the path of the current B is determined as in step 76 in the first embodiment. That is, deterioration of the cable 11a or 11b through which the current B flows or deterioration of the primary winding 4b and deterioration of electrical components, such as a transistor of the inverter 3 which supplies the current B, are determined (step 128).

Next, a case where only the error detection section 131 has detected an error (step 122) will be described. Also in this case, the abnormal line detection section 32 acquires the output of the current sensor 6 to determine whether or not the current B flows through the current sensor 6 (step 129). When no current flows through the current sensor 6, the abnormal line detection section 32 determines that a wrong connection or a disconnection has occurred in both the path (the primary winding 4b or the cables 11a and 11b) of the current B and the path (the primary winding 4a or the cables 10a and 10b) of the current A, as in step 125 described above (step 130).

On the other hand, when the current B flows in step 124, the process proceeds to step 132 to determine whether the waveform of the "current C–current B" obtained by addition in the adder 13 has the same phase as the "–current B" detected by the current sensor 6 or has a different phase. Then, as in step 127, when the waveform of the "current C–current B" obtained by addition in the adder 131 has the same phase as the "–current B" detected by the current sensor 6, deterioration or disconnection of the path of the current C is determined. That is, incorrect wiring, disconnection, or deterioration of the cable 12a or 12b through which the current C flows or disconnection or deterioration of the primary winding 4c and deterioration of electrical components, such as a transistor of the inverter 3 which supplies the current C, are determined (step 133).

On the other hand, when the waveform of the "current C–current B" has a different phase from the "–current B" detected by the current sensor 6 in step 132, deterioration of the path of the current B is determined as in step 128. That is, deterioration of the cable 11a or 11b through which the current B flows or deterioration of the primary winding 4b and deterioration of electrical components, such as a transistor of the inverter 3 which supplies the current B, are determined (step 134).

Next, a case where both the error detection sections 31 and 131 have detected errors (step 123) will be described. The abnormal line detection section 32 acquires the output of the current sensor 6 to determine whether or not a current flows through the current sensor 6 (step 135). When no current flows through the current sensor 6, the error of the error detection section 31 is a detection of a wrong connection or a disconnection of the cables 11a and 11b of the primary winding 4b. Accordingly, it can be determined that there are no abnormalities in the cables 10a and 10b of the primary winding 4a. In addition, since the error detection section 131 has also detected an error, it can be determined that there are no abnormalities in the cables 12a and 12b of the primary winding 4c. From the above, the abnormal line detection section 32 determines that wrong connection or disconnection has occurred in the path (the primary winding 4b or the cables 11a and 11b) of the current B (step 136).

On the other hand, when the current B flows in step 135, the process proceeds to steps 137 and 138 to compare the waveform of the "current A–current B" obtained by addition in the adder 13, the waveform of the "current C–current B" obtained by addition in the adder 113, and the waveform of the "–current B" detected by the current sensor 6 and determine whether or not these waveforms have the same phase or different phases. As described in the first embodiment, the phase of the waveform of the "current A–current B" obtained by addition in the adder 13 is determined according to which of the comparator 15, which performs comparison with the "+" threshold value, and the comparator 14, which performs comparison with the "–" threshold value, has output a threshold value excess signal first. Similarly, the phase of the waveform of the "current C–current B" obtained by addition in the adder 113 is determined according to which of the comparator 115, which performs comparison with the "+" threshold value, and the comparator 114, which performs comparison with the "–" threshold value, has output a threshold value excess signal first.

When the waveform of the "current A–current B" and the waveform of the "current C–current B" have the same phase and also have the same phase as the "–current B", it can be determined that the amount (amplitude) of the current B is larger than those of the currents A and C. Accordingly, it is determined that deterioration or disconnection has occurred in the path of the current A and the path of the current C (step 139).

In addition, when the waveform of the "current A–current B" and the waveform of the "current C–current B" have the same phase but have different phases from the "–current B", it can be determined that the amount (amplitude) of the current B is smaller than those of the currents A and C. Accordingly, it is determined that deterioration or disconnection has occurred in the path of the current B (step 140).

In addition, when the waveform of the "current A–current B" and the wave form of the "current C–current B" have different phases and the waveform of the "current A–current B" and the waveform of the "–current B" have the same phase, it can be determined that the amount (amplitude) of the current B is larger than that of the current A and the amount of the current C is larger than that of the current B. Accordingly, it is determined that deterioration or disconnection has occurred in the path of the current A and deterioration has occurred in the path of the current B (step 141).

In addition, when the waveform of the "current A–current B" and the waveform of the "current C–current B" have different phases and the waveform of the "current A–current B" and the waveform of the "–current B" have different phases, it can be determined that the amount (amplitude) of the current A is larger than that of the current B and the amount of the current B is larger than that of the current C. Accordingly, it is determined that deterioration or disconnection has occurred in the path of the current C and deterioration has occurred in the path of the current B (step 142).

Thus, according to the present embodiment, the three primary windings 4a, 4b, and 4c are connected in parallel. Therefore, compared with a case where one primary winding is provided, a large current equivalent to three times the current in the case where one primary winding is provided can be supplied if the thickness or the like of the cable is the same, and it is also possible to perform determination regarding whether or not there are abnormalities (incorrect wiring, disconnection, or deterioration) in the paths (primary windings 4a, 4b, and 4c or cables connected thereto) of the three currents A, B, and C and determination regarding a line of the abnormal current path.

In this manner, the control unit 23 can determine that the inverter current is abnormal, stop the apparatus safely, and perform display or the like of the abnormal place.

Although the case where three primary windings are provided has been described in the present embodiment, the present invention can similarly be applied even if four or more primary windings are provided.

Fourth Embodiment

Figure 13:
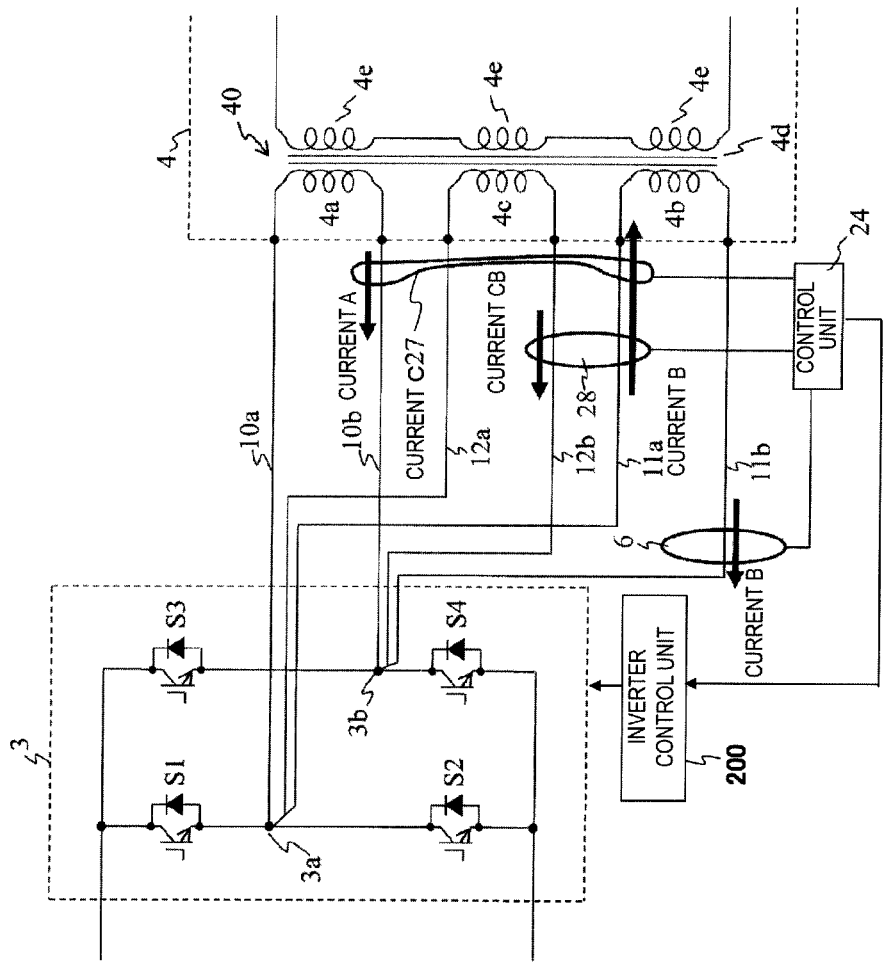
FIG. 13 is a block diagram showing the circuit configuration of a part of an inverter 3 and a transformer of a high voltage generator 4 of a power converter of a fourth embodiment.

In a fourth embodiment, AC current sensors 27 and 28 are used instead of the two current sensors 7 and 8 of the three current sensors 6, 7, and 8 in the third embodiment, and the AC current sensors 27 and 28 are disposed as shown in FIG. 13 so that error determination and abnormal line detection are performed by a control unit 24 with a simple circuit configuration.

In order to detect "current A−current B" by subtracting the current B flowing from the primary winding 4b from the current A output from the primary winding 4a, the AC current sensor 27 is disposed such that two cables 10b and 11a are located inside the coil of the AC current sensor 27. In order to detect "current C−current B" by subtracting the current B flowing through the primary winding 4b from the current A output from the primary winding 4c, the AC current sensor 28 is disposed such that two cables 12b and 11a are located inside the coil of the AC current sensor 28. The current sensor 6 is disposed so as to detect the current B of the cable 11b with an opposite phase as in the third embodiment.

Figure 14:
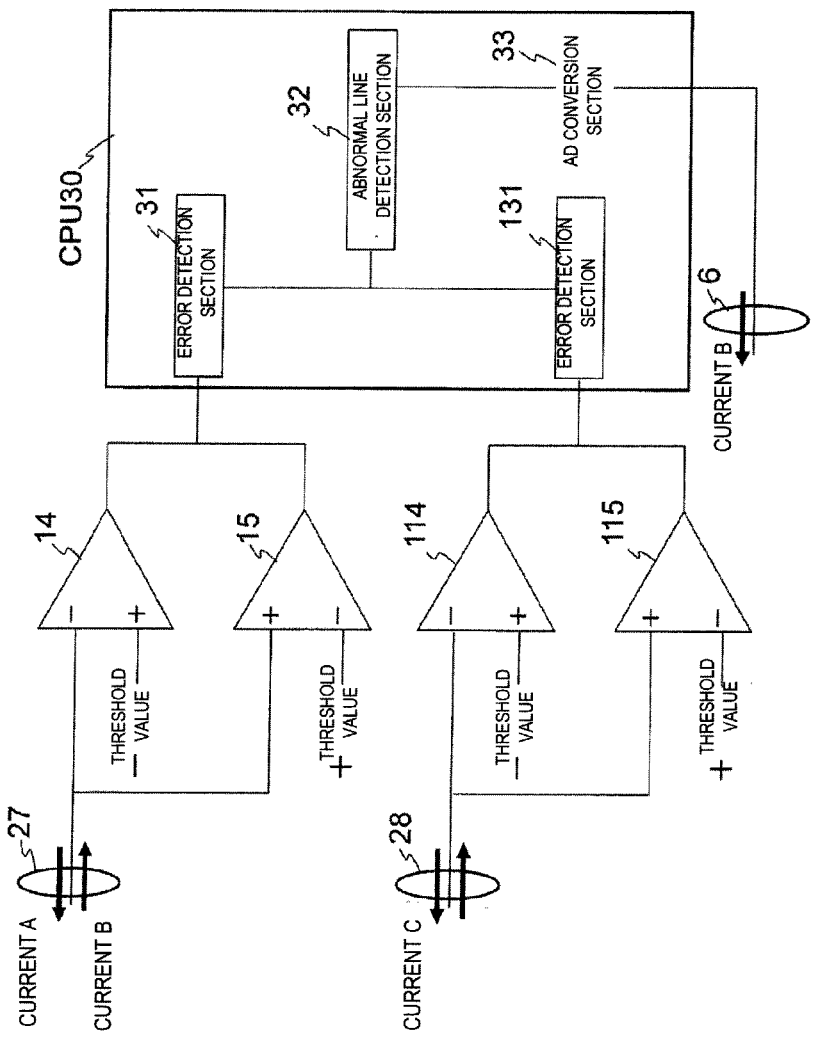
FIG. 14 is a block diagram showing the circuit configuration of a control unit 24 shown in FIG. 13.

The AC current sensors 27 and 28 and the current sensor 6 are connected to the control unit 24. FIG. 14 shows a circuit configuration of the control unit 24. Although the control unit 24 has the same configuration as the control unit 23 (FIG. 11) of the third embodiment as shown in FIG. 14, the control unit 24 does not include the adders 13 and 113. This is because the AC current sensors 27 and 28 detect the "current A−current B" and the "current C−current B", respectively. Since the other configuration is the same as that in the third embodiment, explanation thereof will be omitted.

The operation of the control unit 24 is the same as that of the control unit 23 in the third embodiment except that the adders 13 and 113 are not provided, and determination regarding the presence of incorrect wiring or disconnection and determination regarding a cable (line) in which incorrect wiring or disconnection has occurred are performed. In this manner, the control unit 24 can determine that the inverter current is abnormal, stop the apparatus safely, and perform display or the like of the abnormal line.

As described above, by using the AC current sensors 27 and 28 in the fourth embodiment, it is possible to detect incorrect wiring or disconnection of the cable by the control unit 24 with a simple configuration compared with that in the third embodiment.

In addition, since a subtracted current can be detected by using the AC current sensors 27 and 28, it is not necessary to use high-precision current sensors unlike the case where the current values detected by the current sensors 6, 7, and 8 are added by the adder in the first embodiment. Accordingly, small and inexpensive sensors can be used as the AC current sensors 27 and 28.

Fifth Embodiment

As a fifth embodiment, an X-ray high voltage device using the power converters of the first to fourth embodiment described until now will be described using FIG. 15.

Figure 15:
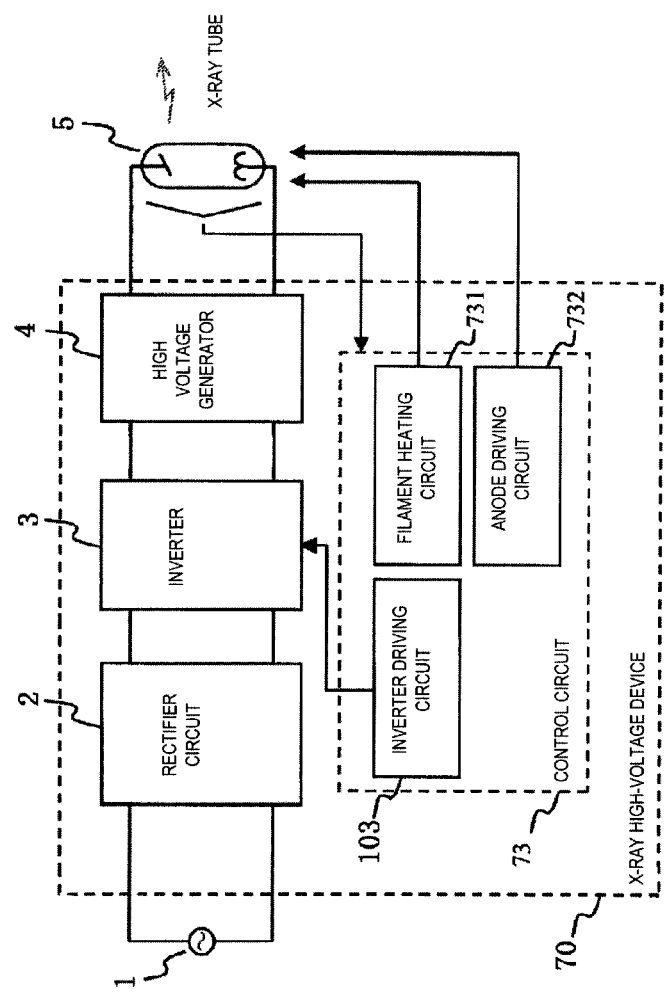
FIG. 15 is a block diagram showing the circuit configuration of an X-ray high voltage device of a fifth embodiment.

As shown in FIG. 15, an X-ray high voltage device 70 of the present embodiment has a rectifier circuit 2, an inverter 3, a high voltage generator 4, and a control circuit 73. An X-ray tube 5 is connected to the high voltage generator 4. The control circuit 73 includes an inverter driving circuit section 3a, a filament heating circuit 731, and an anode driving circuit 732. The rectifier circuit 2, the inverter 3, and the high voltage generator 4 form a power converter, and the structure is one of the configurations of the first to fourth embodiments.

The filament heating circuit 731 heats the filament of the X-ray tube 5. Then, in the X-ray tube 5, thermal electrons are emitted from the heated filament and collide with the anode to generate X-rays. Since the anode with which the thermal electrons collide has an extremely large heat capacity, it is possible to use an anode with a general structure which increases the heat capacity by rotating the anode itself and distributing the energy. The anode of the X-ray tube 5 is disposed in the vacuum vessel, and the isolated anode can be rotated and driven by applying a rotating magnetic field from the outside of the vacuum vessel. The anode driving circuit 732 is a circuit which supplies electric power for generating the rotating magnetic field.

The X-ray high voltage device 70 configured in this manner receives a setting of a tube voltage and a tube current, which are supplied to the X-ray tube 5, from an operator, and the control circuit 73 controls the inverter 3 so that the tube voltage and the tube current have setting values.

By using the X-ray high voltage device of the present embodiment, it is possible to form an X-ray CT apparatus and a roentgen apparatus. Accordingly, it is possible to provide an X-ray CT apparatus or a roentgen apparatus capable of supplying a large current to the X-ray tube 5 with high safety.

Sixth Embodiment

As a sixth embodiment, an X-ray CT (Computer Tomography) apparatus using the X-ray high voltage device 70 of the fifth embodiment will be described using FIG. 16.

Figure 16:
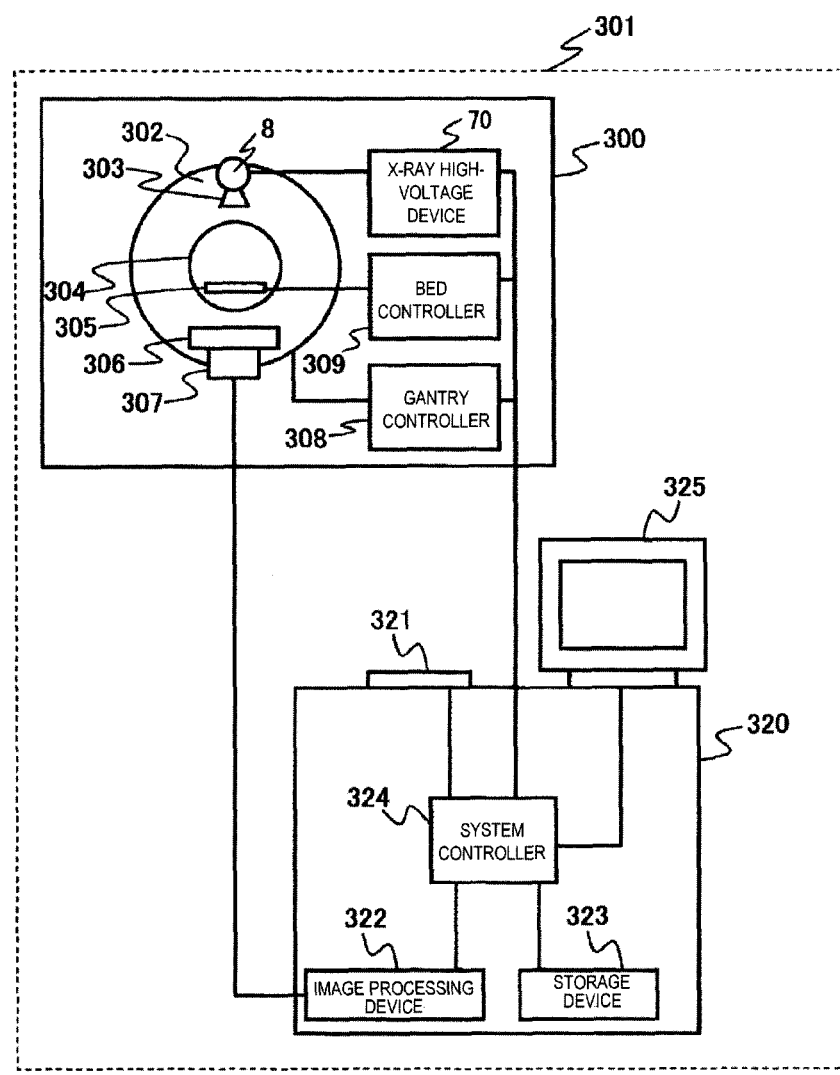
FIG. 16 is a block diagram showing the circuit configuration of an X-ray CT apparatus of a sixth embodiment.

FIG. 16 is a view showing the entire configuration of an X-ray CT apparatus 301 to which the present invention is applied. This apparatus includes a scan gantry unit 300 and a console 320.

The scan gantry unit 300 includes an X-ray tube 5, a rotary disk 302, a collimator 303, an X-ray detector 306, a data collection device 307, a bed 305, a gantry controller 308, a bed controller 309, and an X-ray high voltage device 70. The X-ray tube 5 is a device which emits X-rays to an object placed on the bed 305. The collimator 303 is a device which controls the emission range of X-rays emitted from the X-ray tube 5. The X-ray detector 306 is a device which is disposed opposite the X-ray tube 5 and detects X-rays transmitted through the object. The rotary disk 302 includes an opening 304 through which the object placed on the bed 305 is inserted and also includes a driving unit in which the X-ray tube 5 and the X-ray detector 306 are mounted and which rotates around the object. The X-ray detector 306 has a configuration in which a plurality of detection elements (for example, 1000 detection elements) are disposed in a rotation direction (also called a channel direction) of the rotary disk 302. Assuming that the alignment of a plurality of detection elements in the rotation direction is one column, a plurality of columns (for example, 64 columns) may be arranged in the rotation axis direction (also called a slice direction) of the rotary disk 302.

The X-ray high voltage device 70 is a device which supplies a tube voltage and a tube current to the X-ray tube 5, and the X-ray high voltage device 70 of the fifth embodiment is used. The data collection device 307 is a device which converts X-rays detected by the X-ray detector 306 into predetermined electric signals. The gantry controller 308 is a device which controls the rotation of the rotary disk 302. The bed controller 309 is a device which controls vertical movement and back and forth movement (movement in a direction of the rotation axis of the rotary disk 302) of the bed 305.

The console 320 includes an input device 321, an image processing device 322, a display device 325, a storage device 323, and a system controller 324. The input device 321 is a device for inputting the name of the object, examination date and time, imaging conditions, and the like. Specifically, the input device 121 is a keyboard, a pointing device, or the like. The image processing device 322 is a device which reconstructs a CT image by executing arithmetic processing on the measurement data transmitted from the data collection device 307. Specifically, the image processing device 322 is a CPU (Central Processing Unit) which executes arithmetic processing or a dedicated arithmetic circuit. The display device 325 is a device which displays the CT image created by the image processing device 322. Specifically, the display device 325 is a CRT (Cathode Ray Tube), a liquid crystal display, or the like. The storage device 323 is a device which stores the data collected by the data collection device 307 and the image data of the CT image created by the image processing device 322. Specifically, the storage device 323 is an HD (Hard Disk) or the like. The system controller 324 is a device which controls these devices, the gantry controller 308, the bed controller 309, and the X-ray high voltage device 70.

A tube current and a tube voltage controlled by the X-ray high voltage device 70 such that the imaging conditions input through the input device 321 are satisfied are supplied to the X-ray tube 5, and the X-ray tube 5 emits X-rays.

Since the X-ray high voltage device 70 can supply a large tube current to the X-ray tube 5, X-rays can be emitted with high intensity.

X-rays emitted from the X-ray tube 5 and transmitted through the object are detected by X-ray detection elements of the X-ray detector 306. In the mean time, the rotary disk 302 rotates the X-ray tube 5 and the X-ray detector 306, so that X-rays are emitted from all directions of the object and are detected. The rotation speed of the rotary disk 302 is controlled by the gantry controller 308 such that the imaging conditions (scanning speed and the like) input through the input device 321 are satisfied. In addition, while X-rays are being emitted and detected, the bed 305 moves the object in the body axis direction under the control of the bed controller 309 and operates such that the imaging conditions (helical pitch and the like) input through the input device 321 are satisfied.

An output signal of the X-ray detector 306 is collected by the data collection device 307. The projection data collected by the data collection device 307 is transmitted to the image processing device 322. The image processing device 322 performs a reconstruction operation of the projection data to create a CT image. The reconstructed CT image is displayed on the display device 325 and is stored in the storage device 323 as image data together with the imaging conditions.

By using the X-ray high voltage device 70 of the present invention in the X-ray CT apparatus of the present embodiment, a large current can be supplied to the X-ray tube 5 and the apparatus can operate safely.

Seventh Embodiment

As a seventh embodiment, an X-ray imaging apparatus using the X-ray high voltage device of the fifth embodiment will be described using FIG. 17.

Figure 17:
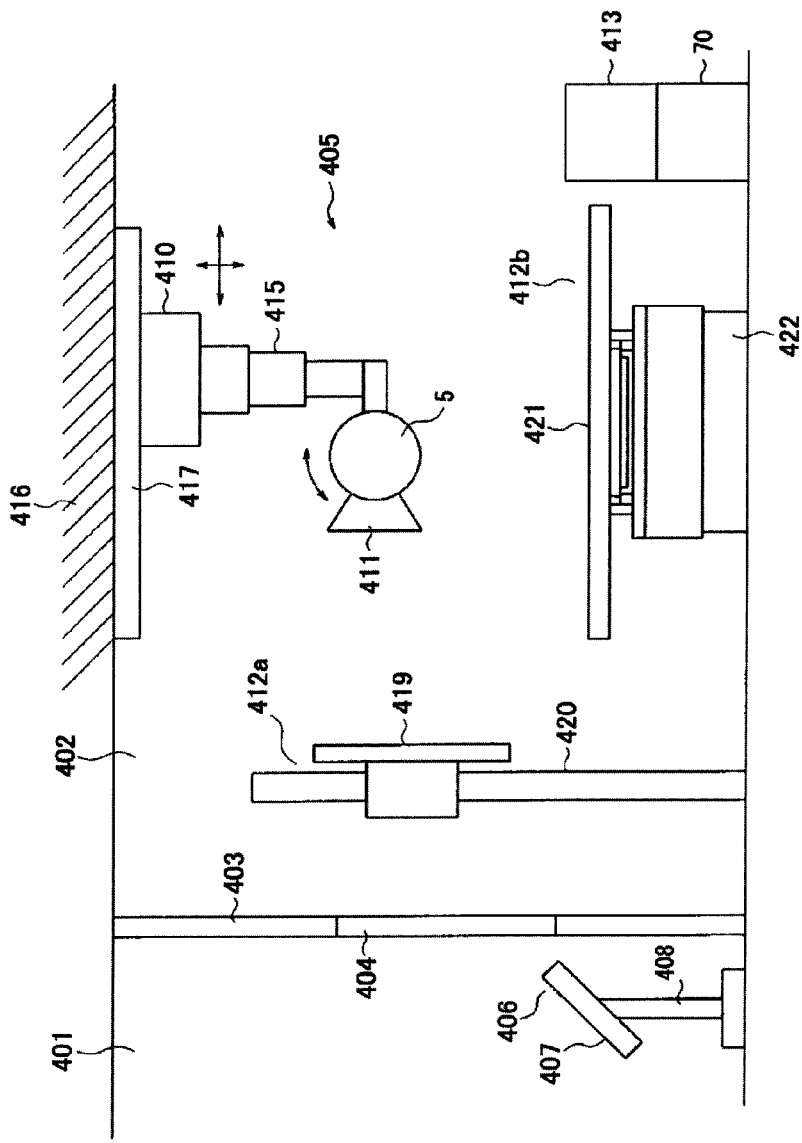
FIG. 17 is a block diagram showing the circuit configuration of an X-ray imaging apparatus of a seventh embodiment.

As shown in FIG. 17, an X-ray imaging apparatus 405 of the present embodiment is disposed over a control room 401 and an imaging room 402 of the X-ray inspection room. The control room 401 and the imaging room 402 of the X-ray inspection room in a hospital are separated from each other by a protective barrier 403 against X-rays. A window 404 formed of lead glass is provided in the protective barrier 403.

In the imaging room 402, main components of the X-ray imaging apparatus 405 are provided. Specifically, an X-ray tube 5, an X-ray tube supporting device 410, a collimator 411, X-ray image receivers 412a and 412b, an X-ray high voltage device 70, and a control device 413 are provided at predetermined positions. The X-ray tube 5 is a device which generates X-rays emitted to the object. The X-ray high voltage device 70 supplies the set tube voltage and tube current to the X-ray tube 5. Since the X-ray high voltage device 70 is a device of the seventh embodiment, explanation of the detailed structure will be omitted herein.

The X-ray tube supporting device 410 has an L type stretchable section 415 with a structure capable of stretching in the vertical direction of the drawing of FIG. 17. The X-ray tube 5 is held at the L type end of the stretchable section 415. The X-ray tube supporting device 410 is fixed to a rail 417 provided on the ceiling 416. The X-ray tube supporting device 410 can move in the horizontal direction of the drawing of FIG. 17 along the rail 417. The collimator 411 determines the exposure field of X-rays.

The X-ray image receivers 412a and 412b are devices which receive an image of X-rays transmitted through the object. In the present embodiment, two X-ray image receivers are disposed. One X-ray image receiver 412a is for imaging the object in a standing state, and the other X-ray image receiver 4126 is for imaging the object in a lying state. The X-ray image receiver 412a for standing position is configured to include an imaging cassette 419 having a film or an imaging plate inside and a supporting base 420 which supports the imaging cassette 419. The X-ray image receiver 4126 for lying position is configured to include an imaging platform 422 and an imaging cassette 421 which is disposed therein and has a film or an imaging plate. When using the X-ray image receiver 412a for standing position, the X-ray tube 5 and the collimator 411 are disposed sideways toward the X-ray image receiver 412a for standing position, as shown in FIG. 17. When using the X-ray image receiver 412b for lying position, the X-ray tube 5 and the collimator 411 are disposed to face downward, so that X-rays are emitted toward the X-ray image receiver 412b.

In addition, instead of the imaging cassettes 419 and 421, it is also possible to adopt a configuration of outputting an X-ray image as a moving image by combining an image intensifier and a TV camera or a configuration which includes a flat panel detector (FPD) in order to output an X-ray image.

An operation machine 406 is provided in the control room 401. The operation machine 406 is configured to include a console 407 and a supporting base 408 which supports the console 407. The console 407 includes an operating unit that receives a setting of imaging conditions, such as a tube voltage and a tube current of the X-ray tube 5 and an imaging time, from the operator, and a display unit. The received setting conditions or the images received by the X-ray image receivers 412a and 412b are displayed on the display unit. In addition, switches for operating the X-ray high voltage device 70, operation buttons for adjusting the amount of opening and closing of the collimator 411, and the like are provided in the console 407.

The control device 413 controls each of the devices described above and also performs display control of the images received by the X-ray image receivers 412a and 412b. In addition, a storage device is provided in the control device 413 so that the imaging conditions and photographed images are stored therein.

In addition, by using the X-ray high voltage device 70 of the present invention in the X-ray imaging apparatus of the present embodiment, a large tube current can be supplied to the X-ray tube 5 and the apparatus can operate safely.

REFERENCE SIGNS LIST

1: commercial power supply
2: rectifier circuit for stepping up or down a voltage
3: inverter
4: high voltage generator
4a to 4c: primary winding
4d: iron core
5: X-ray tube
6, 7, 8: current sensor
13, 113: adder
14, 15, 114, 115: comparator
17, 27, 28: AC current sensor
21, 22, 23, 24: control unit
30: CPU
31, 131: error detection section
32: abnormal line detection section
33: AD conversion section
40: transformer
70: X-ray high voltage device
200: inverter control unit
300: scan gantry
302: rotary disk
303: collimator
305: bed
306: X-ray detector
307: data collection device
308: gantry controller
309: bed controller
320: console
321: input device
322: image processing device
323: storage device
324: system controller
325: display device
401: control room
402: imaging room
403: protective barrier
404: window
405: X-ray imaging apparatus
406: operation machine
407: console
408: supporting base
410: X-ray tube supporting device
411: collimator
412a, 412b: X-ray image receiver
413: control device
415: stretchable section
416: ceiling
417: rail
419: imaging cassette
420: supporting base
421: imaging cassette
422: imaging platform
731: filament heating circuit
732: anode driving circuit

The invention claimed is:

1. A power converter comprising:
an inverter which converts a DC output into an AC voltage of a predetermined frequency; and
a high voltage generator which receives an output from output terminals of the inverter and boosts the output to a desired high DC voltage,
wherein the high voltage generator includes a transformer having a primary winding and a secondary winding,
the number of primary windings is two or more,
the plurality of primary windings are connected to the output terminals of the inverter in parallel by conductive wires connected to both ends of each primary winding, and
a current sensor, which detects a current flowing through each of the plurality of primary windings, and a control unit, which determines abnormalities of a path of the inverter and the primary windings on the basis of a value of the current sensor, are provided.

2. The power converter according to claim 1,
wherein, when determining the abnormalities, the control unit determines that abnormalities have occurred, from the output of the current sensor, when a current of any of the plurality of primary windings does not flow or is smaller than current values of the other primary windings.

3. The power converter according to claim 1,
wherein, when determining the abnormalities, the control unit outputs a signal to stop the inverter to an inverter control unit that controls the inverter.

4. The power converter according to claim 2,
wherein the current sensor detects a current flowing into any of the plurality of primary windings and a current flowing from the different primary winding, and
the control unit calculates the difference between the amount of the two currents detected by the current sensor and determines that abnormalities have occurred when the difference exceeds a threshold value set in advance.

5. The power converter according to claim 2,
wherein the current sensor detects a current by calculating the difference between the amount of a current flowing into any of the plurality of primary windings and the amount of a current flowing from the different primary winding, and
the control unit determines that abnormalities have occurred when the current detected by the current sensor exceeds a threshold value set in advance.

6. The power converter according to claim 5,
wherein the current sensor is an AC current sensor which has a coil, in which both a conductive wire for supplying a current to any of the primary windings and a conductive wire for returning a current from the different primary winding are disposed in an inner space, and which detects a current flowing through the coil.

7. The power converter according to claim 4,
wherein, when the abnormalities are determined, on the basis of whether or not a current flows through any one of the plurality of primary windings, the control unit specifies a primary winding through which the current does not flow.

8. The power converter according to claim 5,
wherein, when the abnormalities are determined, on the basis of whether or not a current flows through any one of the plurality of primary windings, the control unit specifies a primary winding through which the current does not flow.

9. An X-ray CT apparatus comprising:
a disk having an opening through which an object is inserted;
an X-ray tube and an X-ray detector mounted at opposite positions with the opening of the disk interposed therebetween;
an X-ray high voltage device which supplies DC power to the X-ray tube;
a bed on which an object is placed and is inserted into the opening of the disk; and
a rotation driving unit that rotates the disk,
wherein the X-ray high voltage device includes the power converter according to claim 1.

10. An X-ray imaging apparatus comprising:
an X-ray tube;
an X-ray image receiver which detects X-rays transmitted through an object; and
an X-ray high voltage device which supplies DC power to the X-ray tube,
wherein the X-ray high voltage device includes the power converter according to claim 1.

* * * * *